United States Patent
Pizzarello et al.

(10) Patent No.: US 9,729,102 B2
(45) Date of Patent: *Aug. 8, 2017

(54) LOW PROFILE SOLAR TRACKING SYSTEMS AND METHODS

(71) Applicants: Guy A. Pizzarello, San Clemente, CA (US); Lance S. Noller, Yorba Linda, CA (US)

(72) Inventors: Guy A. Pizzarello, San Clemente, CA (US); Lance S. Noller, Yorba Linda, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/151,363

(22) Filed: May 10, 2016

(65) Prior Publication Data
US 2016/0365829 A1   Dec. 15, 2016

Related U.S. Application Data

(63) Continuation of application No. 12/953,119, filed on Nov. 23, 2010, now Pat. No. 9,347,692.
(Continued)

(51) Int. Cl.
*F24J 2/38*   (2014.01)
*F24J 2/10*   (2006.01)
(Continued)

(52) U.S. Cl.
CPC .............. *H02S 20/32* (2014.12); *F24J 2/5233* (2013.01); *F24J 2/541* (2013.01); *F24J 2/5424* (2013.01);
(Continued)

(58) Field of Classification Search
USPC ....... 126/571–577, 500, 523, 677, 657, 702, 126/601, 684; 136/243–246
See application file for complete search history.

(56) References Cited

U.S. PATENT DOCUMENTS

| | | | |
|---|---|---|---|
| 3,861,379 A | 1/1975 | Anderson, Jr. | |
| 4,120,282 A | 10/1978 | Espy | |

(Continued)

FOREIGN PATENT DOCUMENTS

| | | |
|---|---|---|
| WO | 2009139586 A2 | 11/2009 |
| WO | 2011053659 A1 | 5/2011 |

OTHER PUBLICATIONS

International Searching Authority, International Search Report and Written Opinion, corresponding to International Appl. No. PCT/US2010/57866, International Filing Date Nov. 23, 2010.
(Continued)

*Primary Examiner* — Avinash Savani
*Assistant Examiner* — Vivek Shirsat
(74) *Attorney, Agent, or Firm* — Donald E. Stout; Stout, Uxa & Buyan, LLP

(57) ABSTRACT

A solar energy collection system comprises a frame for mounting the system on a suitable substrate and a plurality of solar panels disposed adjacent to one another on the frame. A first set of the solar panels are movable relative to a second set of the solar panels, for tracking movement of the sun during the day. Solar panels of the first set are arranged in alternating fashion with solar panels of the second set. In some embodiments of the invention, the panels in the second set of solar panels are stationary. The second set of solar panels, in some embodiments, are disposed substantially flat, relative to the frame and the substrate on which the frame is mounted. In some embodiments, differing from those in which the second set of solar panels are stationary, the second set of solar panels may be arranged to be movable relative to the first set of solar panels.

15 Claims, 16 Drawing Sheets

Related U.S. Application Data

(60) Provisional application No. 61/272,965, filed on Nov. 24, 2009.

(51) Int. Cl.
| | | |
|---|---|---|
| *H02S 20/32* | (2014.01) | |
| *F24J 2/52* | (2006.01) | |
| *F24J 2/54* | (2006.01) | |
| *H02S 30/10* | (2014.01) | |
| *H02S 40/22* | (2014.01) | |

(52) U.S. Cl.
CPC .............. *H02S 30/10* (2014.12); *H02S 40/22* (2014.12); *Y02B 10/20* (2013.01); *Y02E 10/47* (2013.01); *Y02E 10/52* (2013.01)

(56) References Cited

U.S. PATENT DOCUMENTS

| | | | |
|---|---|---|---|
| 4,154,221 A | 5/1979 | Nelson | |
| 4,266,530 A | 5/1981 | Steadman | |
| 4,316,448 A * | 2/1982 | Dodge | F24J 2/16 126/576 |
| 4,429,178 A | 1/1984 | Prideaux et al. | |
| 4,538,661 A * | 9/1985 | Henry | E06B 9/0638 160/189 |
| 5,022,929 A * | 6/1991 | Gallois-Montbrun | F24J 2/405 136/245 |
| 5,228,924 A | 7/1993 | Barker et al. | |
| 5,600,124 A | 2/1997 | Berger | |
| 5,622,078 A | 4/1997 | Mattson | |
| 5,902,417 A * | 5/1999 | Lillington | H01L 31/02167 136/246 |
| 6,058,930 A | 5/2000 | Shingleton | |
| 6,089,224 A | 7/2000 | Poulek | |
| 6,691,701 B1 | 2/2004 | Roth | |
| 6,870,087 B1 | 3/2005 | Gallagher | |
| 7,202,457 B2 | 4/2007 | Janus et al. | |
| 7,240,674 B2 | 7/2007 | Patterson | |
| 7,705,277 B2 | 4/2010 | Noble et al. | |
| 7,878,192 B2 * | 2/2011 | Larsen | F24J 2/14 126/692 |
| 9,347,692 B2 * | 5/2016 | Pizzarello | F24J 2/5233 |
| 2004/0238025 A1 | 12/2004 | Shingleton | |
| 2005/0161073 A1 | 7/2005 | Head et al. | |
| 2005/0218657 A1 | 10/2005 | Weesner et al. | |
| 2006/0044511 A1 | 3/2006 | Mackamul | |
| 2007/0051401 A1 | 3/2007 | Aaron | |
| 2007/0070531 A1 | 3/2007 | Lu | |
| 2007/0084502 A1 | 4/2007 | Kelly et al. | |
| 2008/0040990 A1 | 2/2008 | Vendig et al. | |
| 2008/0163864 A1 | 7/2008 | Larson | |
| 2008/0245360 A1 | 10/2008 | Almy et al. | |
| 2008/0251115 A1 * | 10/2008 | Thompson | F24J 2/541 136/251 |
| 2008/0308091 A1 | 12/2008 | Corio | |
| 2009/0032089 A1 | 2/2009 | Chen et al. | |
| 2009/0114267 A1 | 5/2009 | Thompson | |
| 2009/0199846 A1 | 8/2009 | Collins et al. | |
| 2009/0223142 A1 | 9/2009 | Shingleton et al. | |
| 2009/0223315 A1 | 9/2009 | Needham | |
| 2009/0260619 A1 * | 10/2009 | Bailey | F24J 2/07 126/578 |
| 2009/0320827 A1 | 12/2009 | Thompson et al. | |
| 2010/0012113 A1 | 1/2010 | Barbero | |
| 2010/0051086 A1 | 3/2010 | Keshner et al. | |
| 2010/0139647 A1 | 6/2010 | Mata | |
| 2010/0154780 A1 | 6/2010 | Linke | |
| 2010/0175741 A1 | 7/2010 | Thorne | |
| 2010/0192942 A1 | 8/2010 | Jones | |
| 2010/0193009 A1 * | 8/2010 | Wells | H01L 31/02167 136/246 |
| 2010/0212653 A1 | 8/2010 | McDonald | |
| 2010/0258110 A1 | 10/2010 | Krabbe et al. | |
| 2011/0073161 A1 | 3/2011 | Scanlon | |

OTHER PUBLICATIONS

European Patent Office, Extended European Search Report, corresponding to EP Appl. No. 10833876.5, issued on Dec. 4, 2015.

* cited by examiner

SECTION A-A

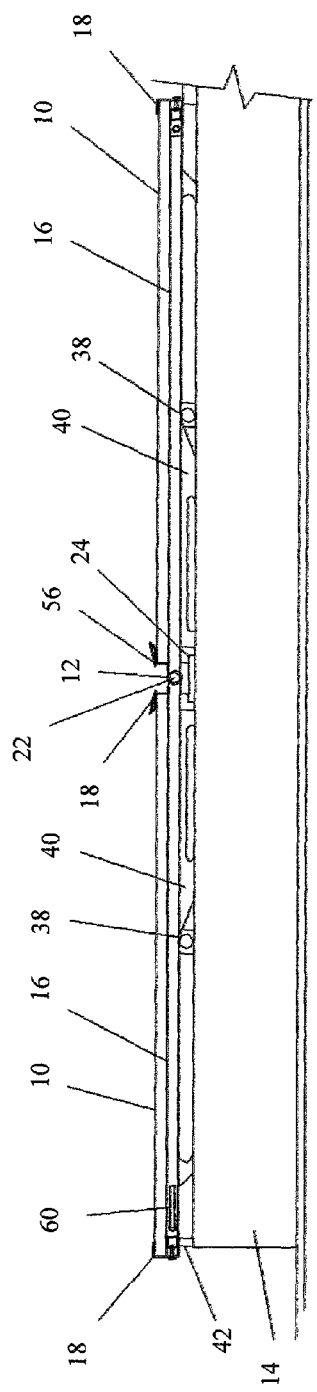
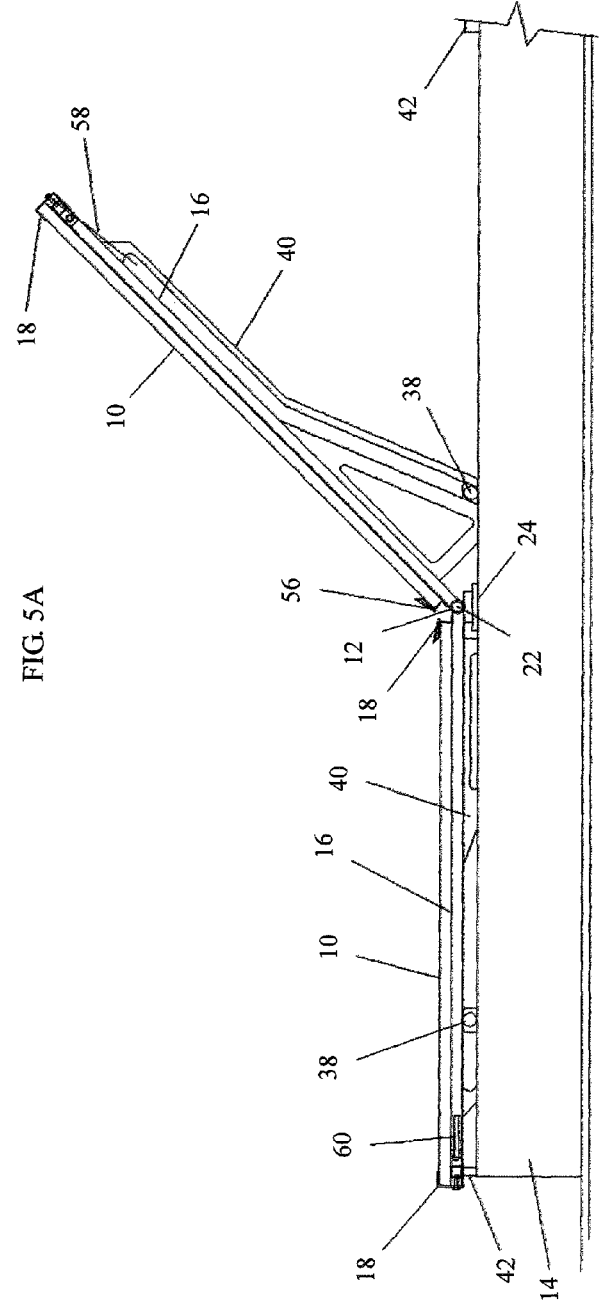

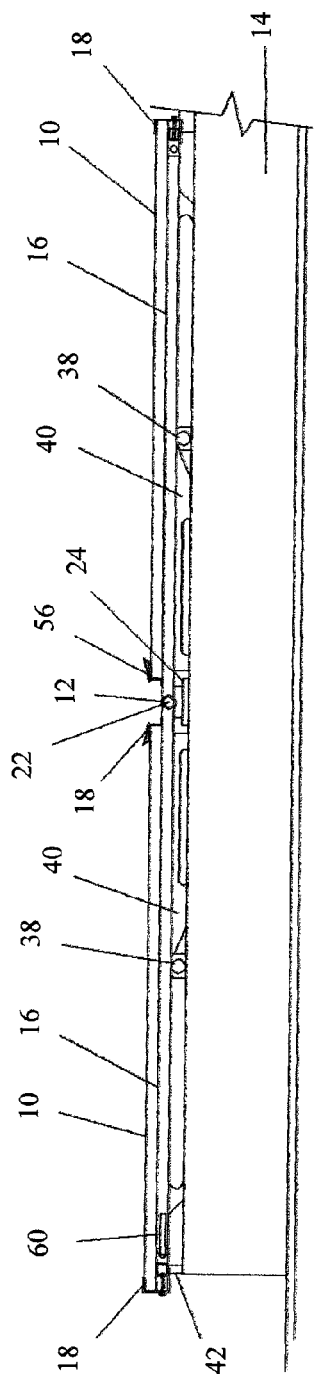
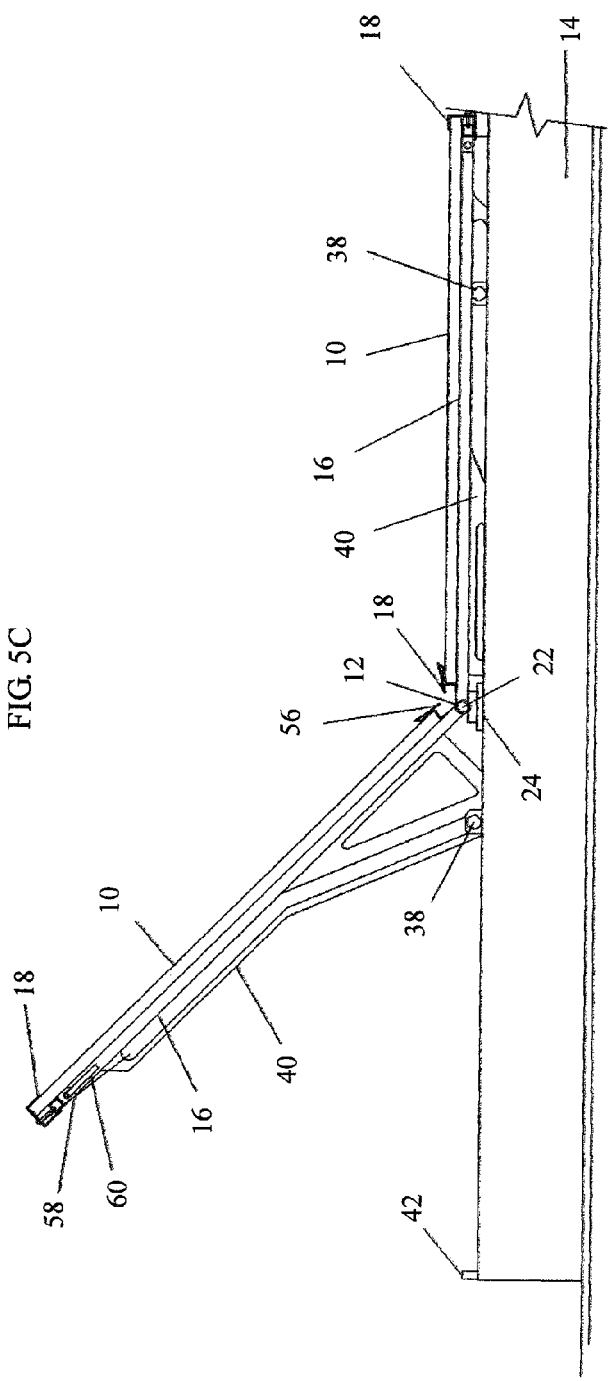

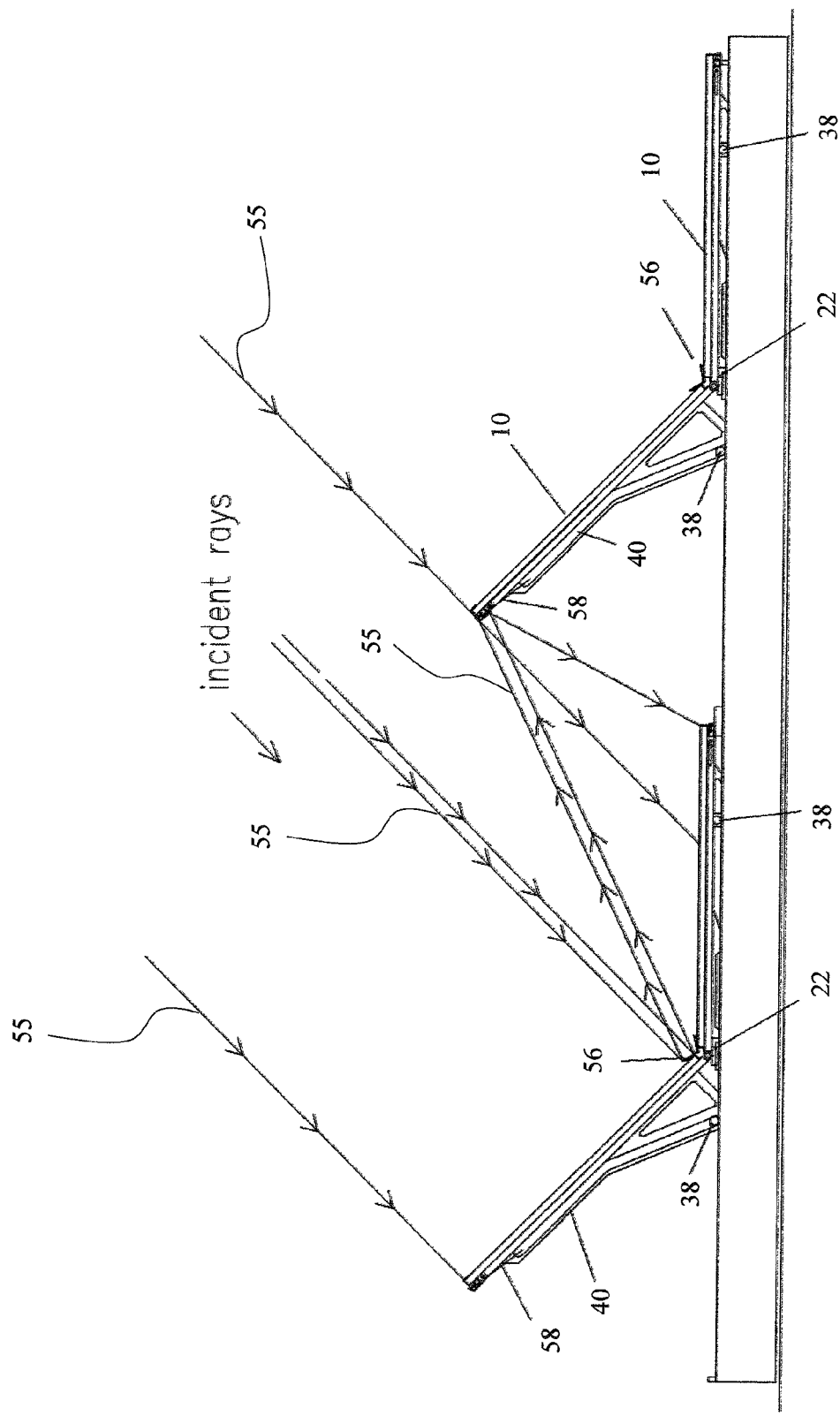

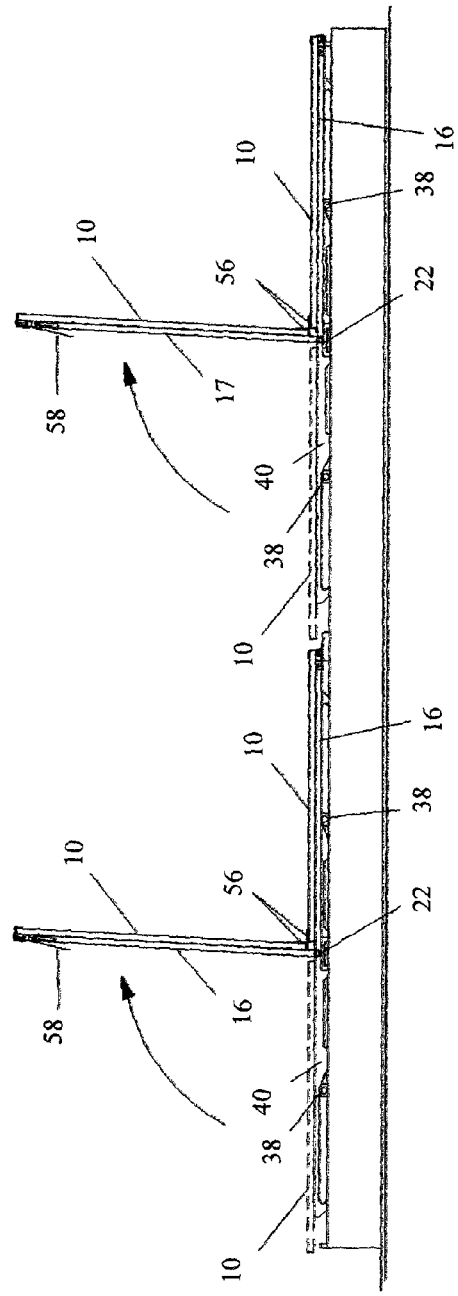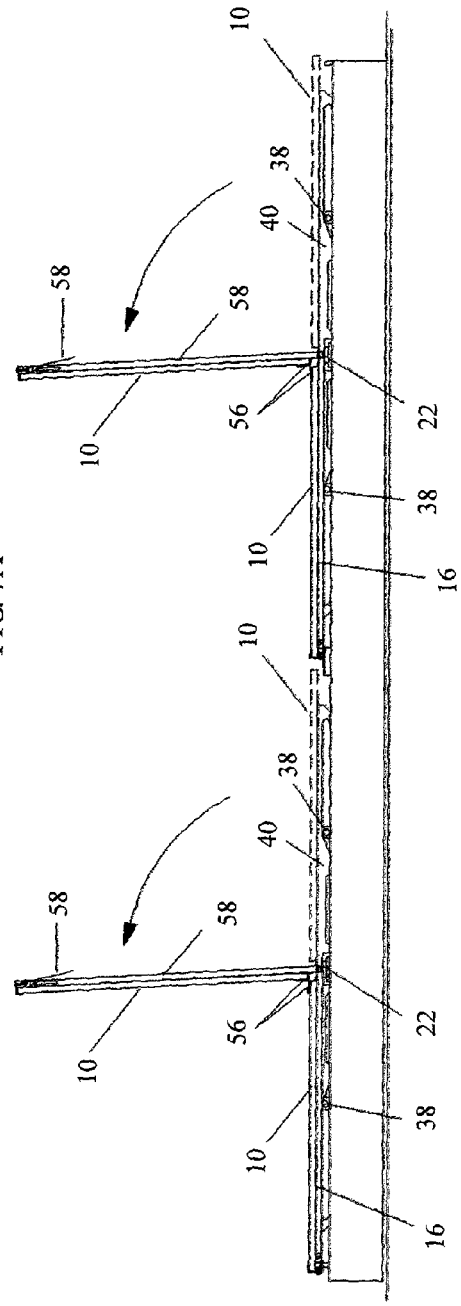

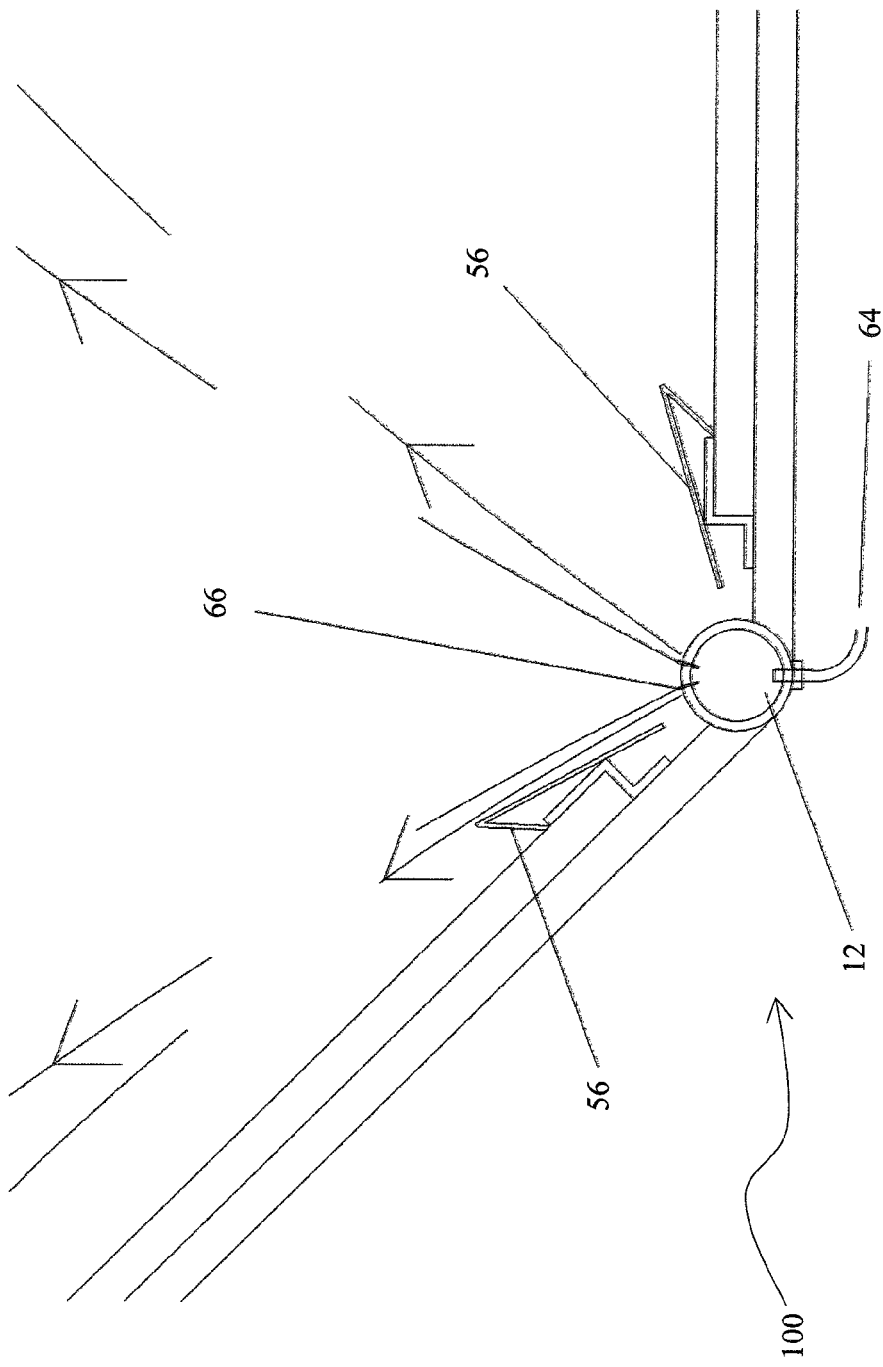

LOW PROFILE SOLAR TRACKING SYSTEMS AND METHODS

CROSS-REFERENCE TO RELATED APPLICATIONS

This application is a continuation under 35 U.S.C. 120 of U.S. application Ser. No. 12/953,119, entitled Low Profile Solar Tracking Systems and Methods, and filed on Nov. 23, 2010, now allowed and scheduled to issue as U.S. Pat. No. 9,347,692 on May 24, 2016, which in turn claims the benefit under 35 U.S.C. 119(e) of the filing date of Provisional U.S. Application Ser. No. 61/272,965, filed on Nov. 24, 2009, and expressly incorporated herein by reference, in its entirety.

BACKGROUND OF THE INVENTION

The present invention is in the technical field of collecting solar energy. More particularly, the present invention is in the technical field of systems that provide an infrastructure for the mounting of solar energy collection devices to the rooftop of a commercial structure\dwelling such that the solar energy collection devices are optimally orientated to the radiation emitted by the sun, as it traverses the sky, from sunrise to sunset. The tracker assembly may also be implemented on patio covers, car ports, parking lot shade structures, and the like.

Prior practice, with respect to the attachment of solar energy collection devices to commercial structures\dwellings, such as photovoltaic (PV) solar panels, is to arrange the solar panels in an array, attaching each panel to the structure's rooftop. In this case, the panels may be arranged in an array mounted flat, or flush, to the dwelling's roofline; mounted in rows wherein each row is tilted at a favorable angle to the sun, typically the location's latitude; arranged in rows wherein each row is, in turn, attached to a single axis tracker system; or arranged in rows or other groupings, wherein each grouping of solar panels is attached to a dual axis tracker system.

Each of these configurations has their advantages and disadvantages. An advantage of the stationary flush mount configuration is that it permits the greatest number of solar panels to be mounted to the structure, thereby providing the greatest utilization of rooftop area. A disadvantage of the stationary flush mount configuration is that the panels are not optimally orientated to the position of the sun, other than when the sun is normal or perpendicular to the panel surface, thereby reducing the overall efficiency of the system. Another disadvantage of this configuration is that when the panels are configured contiguously in a large array, maintenance of any one panel in the array can be problematic. In most cases, each panel is rigidly attached to its underlying roof attachment structure and may not be easily removed. In these cases, maintenance personnel are forced to walk on top of the glass covered solar panels, thereby risking damage to each panel traversed.

An advantage of the single and dual axis tracker mount configurations is that these approaches provide for higher efficiency output per panel, since each panel is more optimally orientated towards the sun during the course of the day. A disadvantage of such tracking configurations is that, due to shading, adjacent rows of panels are typically not mounted contiguous to one another, but, rather, are separated by an optimal distance. The separation of adjacent rows results in a poorer utilization of rooftop area and, in turn, reduces the overall efficiency of the system. Another disadvantage of many single and dual axis trackers is that, because the tracker rotates each panel about its longitudinal axis, the standoff height of the panels must be high enough such that when rotated to their extreme, the panel does not contact the dwelling. This increased standoff height presents higher bending moment loads onto the roof attachment structure in the presence of wind forces and is aesthetically undesirable, especially on sloped rooflines which may not have a parapet.

SUMMARY OF THE INVENTION

The present invention is a system for providing solar energy collection with a modular design or array of solar energy collection devices or panels angled to the position of the sun. The solar collection systems devised in the present invention have either a combination of fixed panels and tracking panels or only tracking panels, both kinds of panels converting sunlight incident upon them to electrical power. The tracking panels of the present invention follow the daily movement of the sun to efficiently collect solar power from dawn to dusk. The present invention includes systems for providing both single axis and dual axis solar tracking. The first axis of the system is used to track solar daily changes, the tracking panels adding power to the system when the sun is moving through zenith between approximately 10 AM to 2 PM. The shadowing of the tracking panels is minimal to zero at noon. The second axis of the system is used to adjust to solar seasonal changes by inclining the solar panel module or system to the appropriate angle. Both axes are driven by motors that are controlled by hardware and programmable software that seeks optimum angular positions both daily and seasonally. The system and software is designed to account for in site installation at any latitude to efficiently track the daily and/or seasonal positions. The present systems in general are also designed to be sufficiently rugged to withstand forces of the elements such as wind, rain, etc., and to meet international and national building code specifications. In addition, the physical structure of the system is designed for ease of installation and maintenance because of its modular design. Such modular design of the solar panels of the present invention allows connections to adjacent modules or arrays on a variety of sites such as residential roof tops, factory rooftops, large ground installations, on patio covers, car ports, parking lot shade structures etc.

One embodiment of the invention is comprised of a central structural channel frame upon which solar panels are mounted, with their longitudinal axis perpendicular to the longitudinal axis of the structural channel frame. Each pair of solar panels shares a common hinge mechanism and each panel of the pair is attached to the hinge on its edge, which is parallel to the longitudinal axis of the panel unit. The hinge, in turn, is mounted to the central structural frame. Attachment to the edge of each solar panel is advantageous because it permits a smaller standoff height to be used in comparison to the standoff height that must be used when rotating the solar panel about its longitudinal centerline axis.

A linear actuator moves a force transmission drive shaft back and forth within the central structural frame. The drive shaft contacts a cam surface on the underside of each panel, the force of which results in the panel rotating about its hinge axis. In one embodiment, every other panel shares the same rotary position. In other words, in the morning, the $1^{st}$ and $3^{rd}$ panel will rotate together from an eastwardly facing direction to horizontal, the $2^{nd}$ and $4^{th}$ panels will remain horizontal. In the afternoon, the $1^{st}$ and $3^{rd}$ panels will remain horizontal, while the $2^{nd}$ and $4^{th}$ panels will rotate from horizontal to a westerly facing direction. In a variation of this embodiment where there are alternating fixed and tracking panels, the $1^{st}$ and $3^{rd}$ panel will rotate together from an eastwardly facing direction in the morning all the way to a westerly facing direction at the end of the day, with the $2^{nd}$ and $4^{th}$ panels being fixed, and therefore horizontal. Each of these systems, of course, may be equipped with either a single axis for daily tracking only or a dual axis for daily tracking as well as seasonal tracking.

In order to minimize the effects of shading on adjacent panels of a pair of panels that share the same hinge axis by a neighboring panel of an adjacent panel pair, reflector surfaces are mounted to reflect photons on to the area of the shaded panel. In addition, back-tilting of the shaded panel may also be used to minimize the length of the shadow cast upon it. The common hinge mechanism also permits each panel to be rotated up and out of the way for easy maintenance access after being disengaged from its attached cam surface via a quick-disconnect mechanism. As will be seen hereinafter, the present invention is believed to be an improvement over prior practice in the following areas:

1) Maximum Energy Production: In installations where the structure's roof size is the limiting constraint, the present invention, in its single axis embodiment, does not require space between adjacent rows of panels. This permits the highest utilization of rooftop area to be achieved. Although each panel's individual efficiency is less than that achievable with a prior practice single axis tracker, the combined power output will be greater due to the higher number of panels installed. In addition, the system's integrated cleaning system ensures that the solar panels and reflectors are clean of dirt and other deposits that reduce the system's power generation efficiency.

2) Low Profile Design: The present invention's panel positioning drive system results in a system that is visually indistinguishable from a typical low profile stationary flush mount installation. In addition, the inventive system's low profile design is aesthetically pleasing, and will minimize bending moment loads on to the roof attachment structure in the presence of wind forces. This invention can also be easily attached to sloped roof lines.

3) Easy Maintenance: The innovative design of the inventive system facilitates maintenance by providing a quick-disconnect release system which, when activated, permits the solar panel to be rotated up and out the way. This configuration permits easy access to the underlying tracker mechanism and roof structure.

More particularly, there is provided a solar energy collection system in accordance with the principles of the invention, which comprises a frame for mounting the system on a suitable substrate and a plurality of solar panels disposed adjacent to one another on the frame. A first set of the solar panels are movable relative to a second set of the solar panels, for tracking movement of the sun during the day. Advantageously, solar panels of the first set are arranged in alternating fashion with solar panels of the second set. In some embodiments of the invention, the panels in the second set of solar panels are stationary. The second set of solar panels, in some embodiments, are disposed substantially flat, relative to the frame and the substrate on which the frame is mounted. In some embodiments, differing from those in which the second set of solar panels are stationary, the second set of solar panels may be arranged to be movable relative to the first set of solar panels.

In preferred embodiments, a first solar panel in the first set is pivotally connected to a second solar panel in the second set, to form a tracking unit. The solar energy system as a whole preferably comprises a plurality of tracking units. A hinge connects the first and second solar panels in each of the tracking units. A hinge daily axis lies along the hinge, wherein each of the first and second panels in each of the tracking units pivots about the hinge daily axis independently of the other of the first and second panels. The frame preferably comprises a structural channel frame having a channel portion, and a drive system for pivoting each of the first and second panels in a tracking unit is disposed within the channel portion.

The drive system preferably comprises a drive shaft extending lengthwise through the channel portion, and a plurality of camming systems attached to the drive shaft for pivoting each one of the first and second solar panels in each tracking unit independently of the other one of that tracking unit's first and second solar panels.

Preferably, a plurality of tracking units are disposed on the structural channel frame. The system preferably comprises a plurality of structural channel frames, each of which accommodates the aforementioned plurality of tracking units. Each of the solar panels has a top surface and a bottom surface. Preferably, the system incorporates features which mitigate the shading of portions of one solar panel by adjacent panels which have been pivoted to better track the sun's position. These features preferably include a reflector disposed on at least one of the solar panels of a tracker unit to improve solar collection efficiency of the system. In presently preferred embodiments, the reflector comprises a first reflector disposed on the bottom surface of one of the first and second solar panels, for redirecting light to a shaded portion of the top surface of the other one of the first and second solar panels. A second reflector may be disposed on the top surface of the other of the first and second solar panels, for redirecting light to the first reflector.

Still another advantageous feature of the present invention is that the system comprises a liquid supply line and liquid jet orifices for cleaning the solar panels. The cleaning may be scheduled to occur automatically, or may be performed manually, upon demand, by the actuation of an appropriate switch on the control unit. Yet another unique and advantageous feature is that the system further comprises a quick-disconnect release mechanism for disengaging a panel from the drive system so that it can be manually moved for maintenance purposes.

In yet another aspect of the invention, there is provided a solar energy collection system, which comprises a frame for mounting the system on a suitable substrate. The system comprises a pair of solar panels disposed adjacent to one another and independently movable relative to one another, wherein each of the solar panels has a top surface and a bottom surface. A reflector is disposed on the bottom surface of one of the pair of solar panels, for redirecting light to a shaded portion of the top surface of the other one of the pair of solar panels. Preferably, the solar panels further include a second reflector disposed on the top surface of the other of the first and second solar panels, for redirecting light to the bottom surface reflector.

In still another aspect of the invention, there are disclosed unique and advantageous methods for collecting solar energy, using a system comprising a frame and an array comprising a plurality of solar panels connected to the frame, wherein the frame is mounted onto a suitable substrate, such as a rooftop. The methods comprise steps of programming a controller in the system to track the sun's position as the day progresses, accounting for seasonal variation, as well as using the controller to move some of the solar panels in the array relative to other stationary solar panels in the array. Accordingly, the moving solar panels pivot in order to maintain an orientation facing the sun as the relative position of the sun to the solar panel array changes.

The invention, together with additional features and advantages thereof, may best be understood by reference to the following description taken in conjunction with the accompanying illustrative drawings.

BRIEF DESCRIPTION OF THE DRAWINGS

FIG. 5A is a side view of the tracking assembly, showing a single tracking unit in the horizontal tracking start position;

FIG. 5B is a side view of the tracking assembly, showing a single tracking unit in a typical morning tracking position;

FIG. 5C is a side view of the tracking assembly, showing a single tracking unit in the horizontal tracking noon position;

FIG. 5D is a side view of the tracking assembly, showing a single tracking unit in a typical afternoon tracking position;

FIG. 6 is a side view of the tracking assembly, comprised of two tracking units, showing the reflectance of photons on to the shaded portion of a solar panel;

FIGS. 7A and 7B are side views of the tracking assembly, comprised of two tracking units, with the solar panels rotated into the maintenance position;

FIG. 8A is a side view of the tracking unit, showing details of cleaning and reflector design;

DETAILED DESCRIPTION OF THE INVENTION

Figure 1:
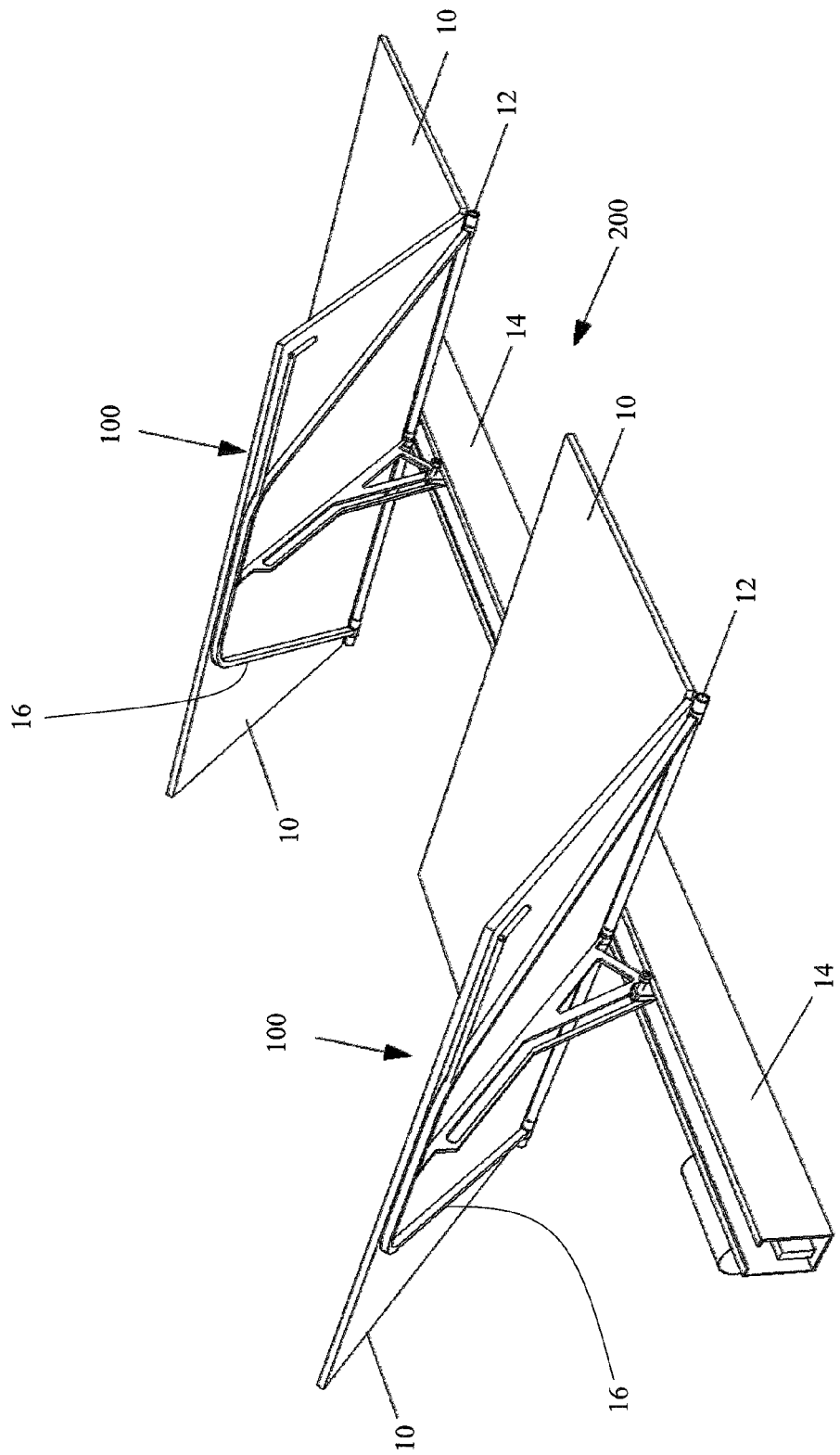
FIG. 1 is a perspective view of one version of the tracking assembly of the present invention, showing solar panels mounted to two tracker units.

Referring now more particularly to the drawings, FIG. 1 shows a perspective view of a tracking assembly 200, which is comprised of one or more tracking units 100. In this particular figure, only two tracking units are shown for clarity. In this embodiment, each tracking unit 100 has two solar panels 10 and provides a hinge shaft 12 shared between two substantially identical and adjacent solar panels 10. In a tracking assembly 200, the tracking units 100 share a common structural channel frame 14.

Figure 2:
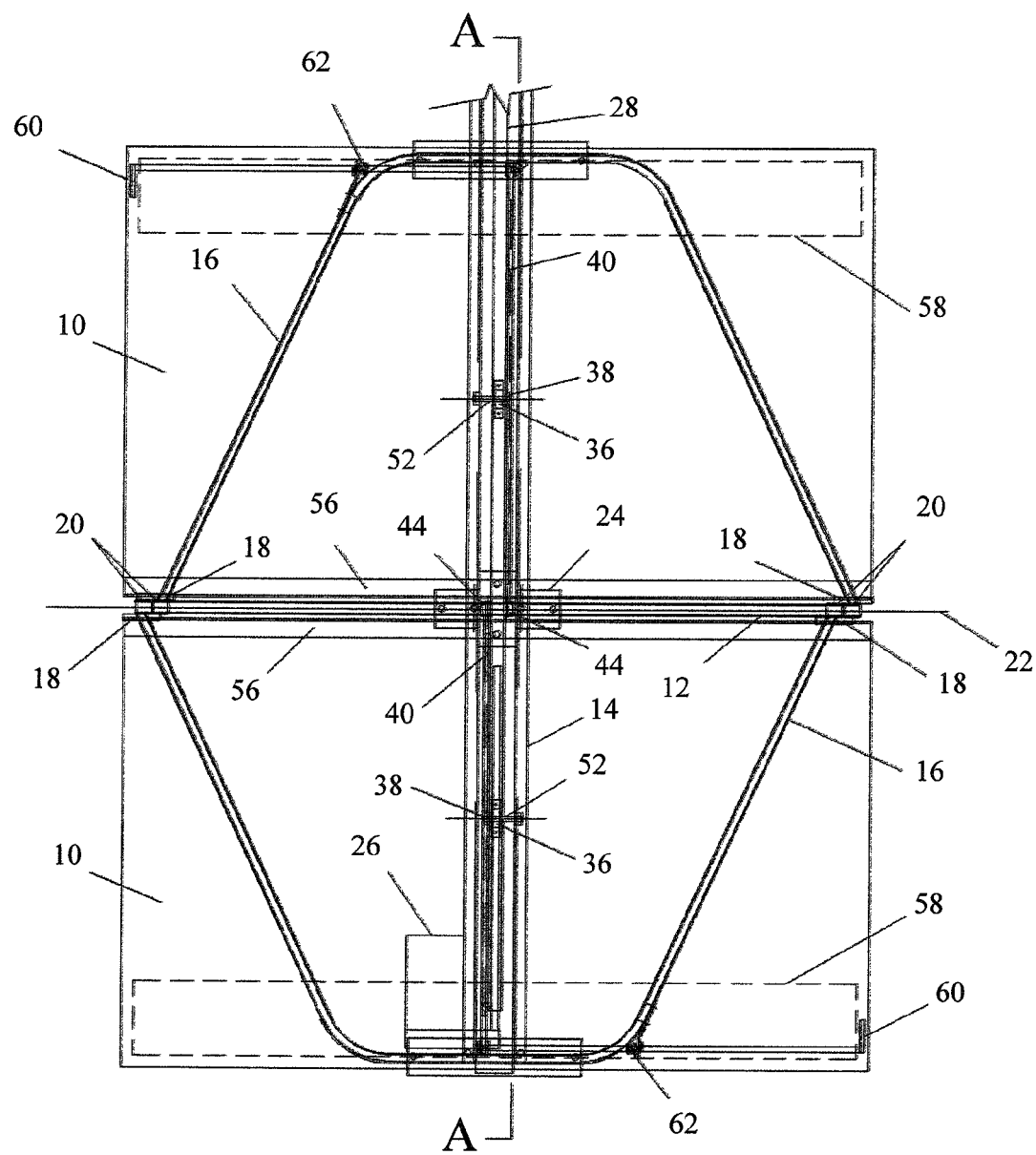
FIG. 2 is a plan view of the structural frame that attaches to the underside of each solar panel.

FIG. 2 shows a plan view of the method of attachment of solar panels 10 to the tracking unit. The underside of each solar panel 10 rests on a respective panel frame 16 and is secured using panel clips 18. Each end of each panel frame 16 is connected to a hinge collar 20, which rotates about the fixed hinge shaft 12. The centerline of the hinge shaft 12 defines the hinge daily axis 22, and is the axis of rotation for the solar panel 10. Frame mounting bracket 24 is used to secure the hinge shaft 12 to the underlying structural channel frame 14, and also may be used to attach the tracking assembly 200 to the underlying substrate, typically a roof. FIG. 2 also defines section A-A, which is rendered in FIG. 3.

Figure 3:
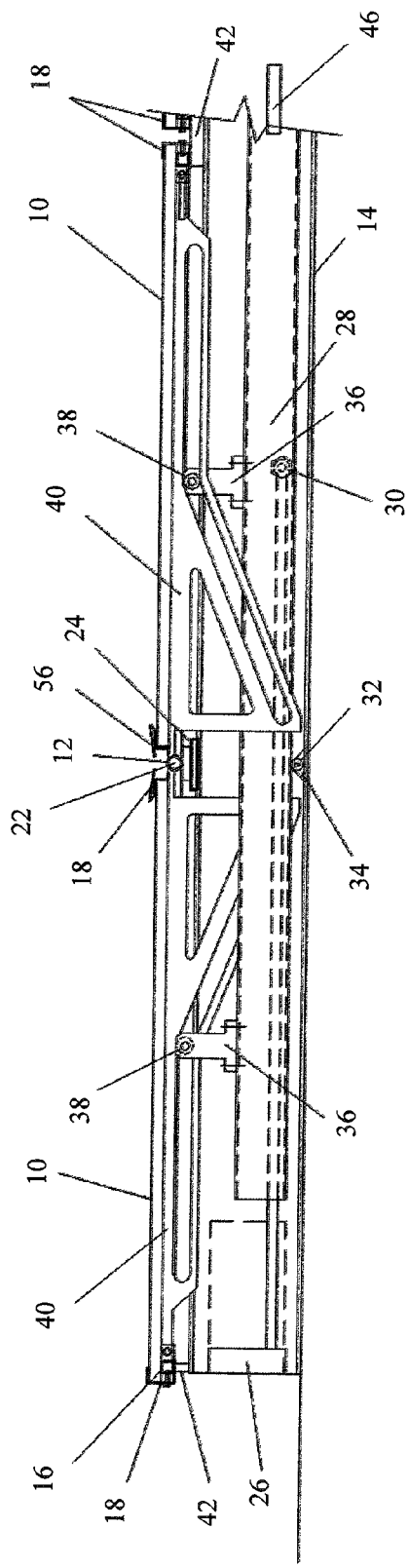
FIG. 3 is a side view of the tracking assembly, showing a single tracking unit.

FIG. 3 shows linear actuator 26 connected to drive shaft 28 using actuator coupler 30. The drive shaft is supported by the drive shaft roller 32, housed in drive shaft roller carrier 34, which is attached to the structural channel frame 14. Cam bearing block 36 is attached to the driveshaft 28. As the drive shaft translates, the cam bearing block's cam bearing 38 travels in the slot of a cam 40. As the cam bearing 38 encounters the inclined slot of the cam 40, the force of contact generates a torque about the hinge daily axis 22 and causes the cam 40 and attached solar panel 10 to rotate upward, about hinge shaft 12, from panel stop 42. Cam 40 is attached to the hinge shaft 12 via cam hinge collar 44, as shown in FIG. 2. The linear actuator 26 is powered by an AC or DC motor that is of low power and is controlled by a system that is seasonally programmed to accurately track the daily solar motion. A drive shaft coupler 46 is used to connect two drive shafts together, thereby permitting a single linear actuator 26 to control one or more tracking assemblies. An optional seasonal axis 48 is also installed at the base of the tracking module that is controlled and powered by a low power AC/DC motor. FIG. 9E shows the location and structure of one optional seasonal axis 48.

Figure 4:
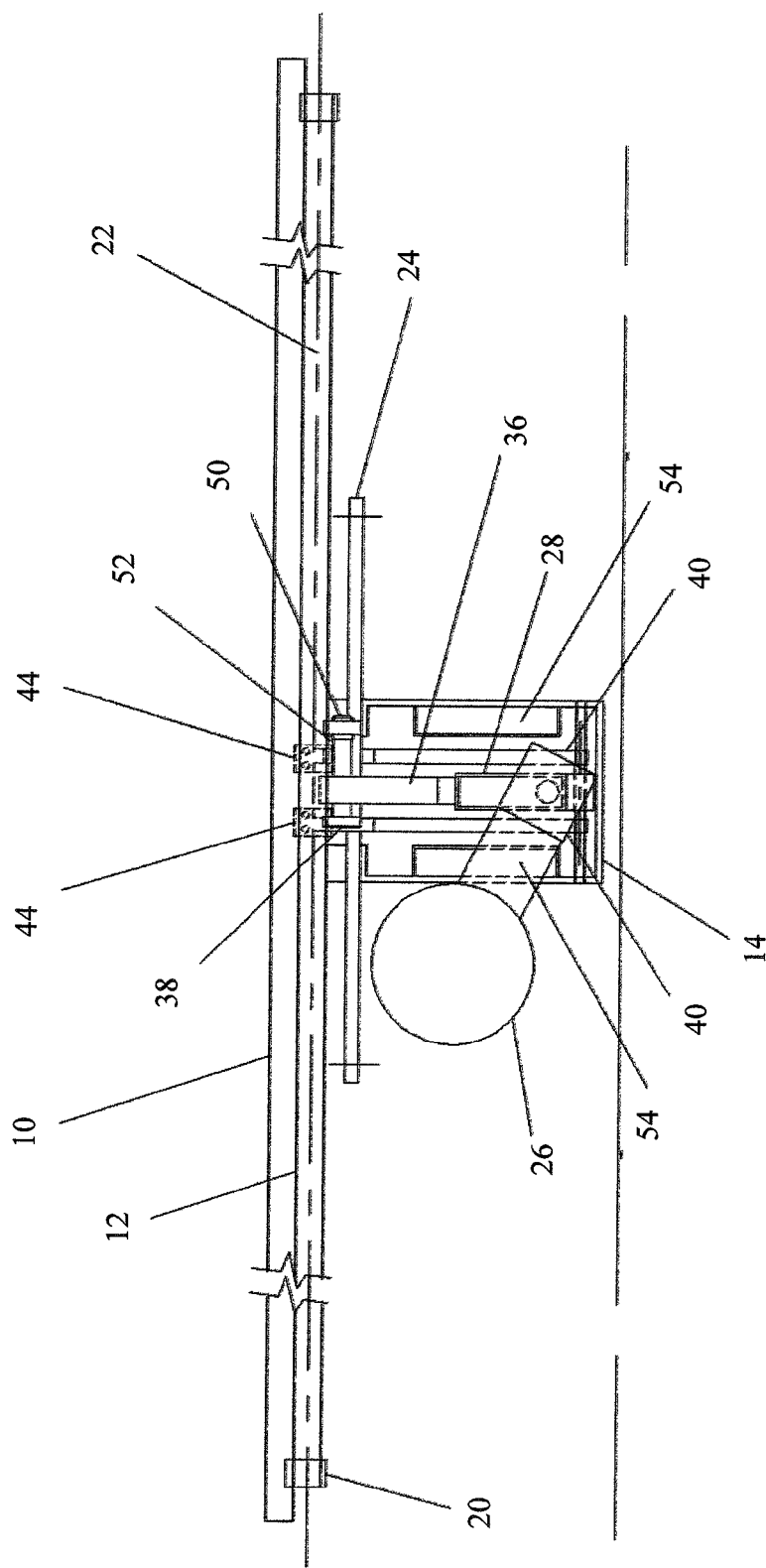
FIG. 4 is an end view of the tracking assembly.

FIG. 4 shows an end view of a tracking assembly 200, with the solar panels 10 in a horizontal position. In the center of the structural channel frame 14 is the drive shaft 28. On each side of the drive shaft resides the cam 40. The cam 40 on the left of the driveshaft is used to rotate the panel located in the back of the hinge shaft 12, while the cam 40 located on the right side of the drive shaft is used to rotate the panel mounted in front of the hinge shaft 12. Each cam 40 has a mating cam bearing block 36, mounted to drive shaft 28, which contains cam bearing 38, a guide bearing 50, and a bearing shaft 52 (Note: cam bearing block 36, cam bearing 38, guide bearing 50, and bearing shaft 52 are shown for the left side cam 40 only, and have been omitted on the right side cam 40 for clarity). As the drive shaft 28 moves, guide bearing 50 contacts structural frame 14 and is used to provide stability of the driveshaft 28. The end of each cam 40 is connected to a cam hinge collar 44, which is mounted concentrically to the fixed hinge shaft 12. On each side of the drive shaft resides a wire trough 54, which provides for the routing and protection of solar panel and control system wiring.

FIG. 5A-5D show the progression of solar panel position from sunrise to sunset. FIG. 5A shows both panels belonging to the same tracking unit in the horizontal flat position. As the sun rises, FIG. 5B shows one of the panels of an adjacent pair of panels facing the sun, and rotated about the hinge daily axis 22, so that the panel's normal is optimally aligned to the sun's radiation. At noon, as shown in FIG. 5C, when the sun is at its zenith, this panel is rotated back so that both panels are positioned horizontally, relative to the substrate on which they are mounted, such as a roof, to receive the perpendicular solar radiation. As the sun sets, FIG. 5D shows the other panel of the adjacent pair of panels facing the sun, and rotated about the hinge daily axis 22, so that the panel's normal is optimally aligned to the sun's radiation. With multiple tracking units in the same assembly, every other panel (alternating panels) will share the same rotary position as shown in FIG. 6. Thus, for an assembly of two tracking units, in the morning the $1^{st}$ and $3^{rd}$ panels will rotate together from an eastwardly facing direction to horizontal, the $2^{nd}$ and $4^{th}$ panels will remain horizontal. In the afternoon, the $1^{st}$ and $3^{rd}$ panels will remain horizontal, while the $2^{nd}$ and $4^{th}$ panels will rotate from horizontal to a westerly facing direction.

Although the present invention does not preclude the mounting of the tracking units at non-optimal centerline distances, such as may be done when high area utilization is not an important design consideration, optimal area utilization is achieved when mounting the tracking units so as to minimize any spacing or gap between solar panel pairs. Of course, doing so results in the shading of portions of intermediate panels. FIG. 6 presents a side view of a tracking assembly, comprised of two tracking units, showing an innovative feature of the invention which permits the reflectance of incident photons 55 onto the shaded portion of a solar panel. Shading naturally occurs as the panel is rotated upward to face the sun and a shadow is cast upon the panel behind it. The present invention compensates for the shading by appropriately affixing reflective surfaces on the panels to cast solar radiation onto the shadowed panel surfaces. The configuration of the reflective surface can be flat, convex, etc., to produce the desired effect. As shown in FIG. 6, photons incident upon the inclined panel, strike a hinge reflector 56, and are reflected upward to the backside of the adjacent inclined panel. A panel reflector 58 is provided on the backside of this adjacent inclined panel to reflect the photons back down onto the flat solar panel 10 and serve to illuminate that portion of the solar panel 10 which is shadowed, and to substantially increase the solar panel's power output. In addition to compensating with reflective surfaces, the shaded flat panel can be (optionally) rotated upward slightly, approximately 5-10 degrees, to reduce the length of the shadow cast upon it. Although the slot in cam 40 is shown as a linear slot, it should be clear to one ordinarily skilled in the art that the geometry of the slot could also include alternate profiles in order to achieve small upward rotations of the shaded panel away from the sun, as the cam bearing 38 reaches the end of the slot in cam 40.

As the panels track the sun, the amount of shading will proceed progressively as a function of panel tilt angle. In the case where two tracking unit panels abut one another, and the shaded panel lies flat, this relationship may be approximated by the equation: $S=(1/\cos Q-1)*100$, where S is the percent of the panel shaded and Q is the panel tilt angle with respect to the horizontal (see FIG. 6). For example, the fraction shaded at 45 degrees is approximately 41%. At angles less than 45 degrees, the percentage of shading will progressively decrease. For example, at 30 degrees the shading percentage is approximately 15%. In other embodiments, where there might be a gap between the panels, or the shaded panel has been rotated slightly upwardly, the shading factors and relationship will vary, but the general principles addressed by the invention will remain.

FIGS. 7A and 7B show a side view of a tracking assembly, comprised of two tracking units 100, with their respective solar panels rotated into a maintenance position. To activate this functionality, a panel release handle 60 (FIGS. 5A and 5B) is retracted. Retracting this handle disengages attachment of panel frame 16 from cam 40. The solar panel can then be manually rotated about its hinge daily axis 22 into an upright position. This position then permits the solar panel to be easily removed for repair or replacement, to gain access to the underlying tracking unit, or to gain access to another panel that may be located in an adjacent tracking assembly row. To re-engage the solar panel, it is lowered back into the horizontal position, with the panel release handle 60 in the retracted position. Upon release of the handle, the release handle return spring 62 (FIG. 2) engages the release handle and secures the panel frame 16 to the cam 40.

Figure 8B:
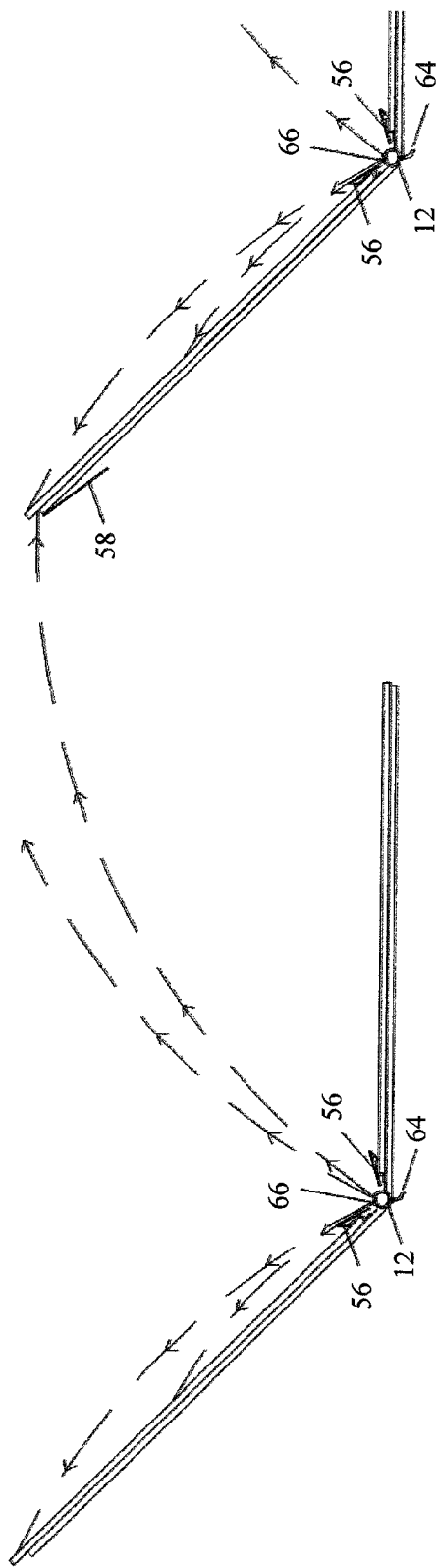
FIG. 8B is a side view of two tracking units, showing trajectory paths of pressurized cleaning fluid onto solar panel and reflectors.

FIGS. 8A and 8B show details of an automated cleaning apparatus, which is used to clean the solar panels and reflectors of dirt and other deposits that reduce the solar panels' power generation efficiency. Under computer control, the cleaning process is programmed to occur at regular intervals, or manually, if desired, such that solar panel efficiency is optimally maintained. FIG. 8A is a side view of the tracking unit 100, showing details of the cleaning and hinge reflector design. In this design, under computer control, an external valve (not shown) is opened, permitting pressurized cleaning fluid to enter the hollow hinge shaft 12 by means of a water supply line with grommet 64. The pressurized cleaning fluid then exits the hinge shaft 12 through numerous water jet orifices 66, and is distributed evenly along the entire length of hinge shaft 12. FIG. 8B shows the pressurized cleaning fluid exiting the water jet orifices 66 in a trajectory that strikes the inclined panel 10 and hinge reflector 56. In addition, pressurized cleaning fluid also exits the water jet orifices 66 in a trajectory that strikes the backside of the next inclined panel, such that the panel reflector 58 is also cleaned.

FIGS. 9A-9E show the present invention in a variety of system configurations, using the tracking assembly 200. Since the tracking assembly 200 is modular, the mounting on most sites will be rapid. The site can be previously affixed with mounting posts, and laid out in an accurate geometrical array, consistent with the dimensions of the tracking assembly.

Figure 9A:
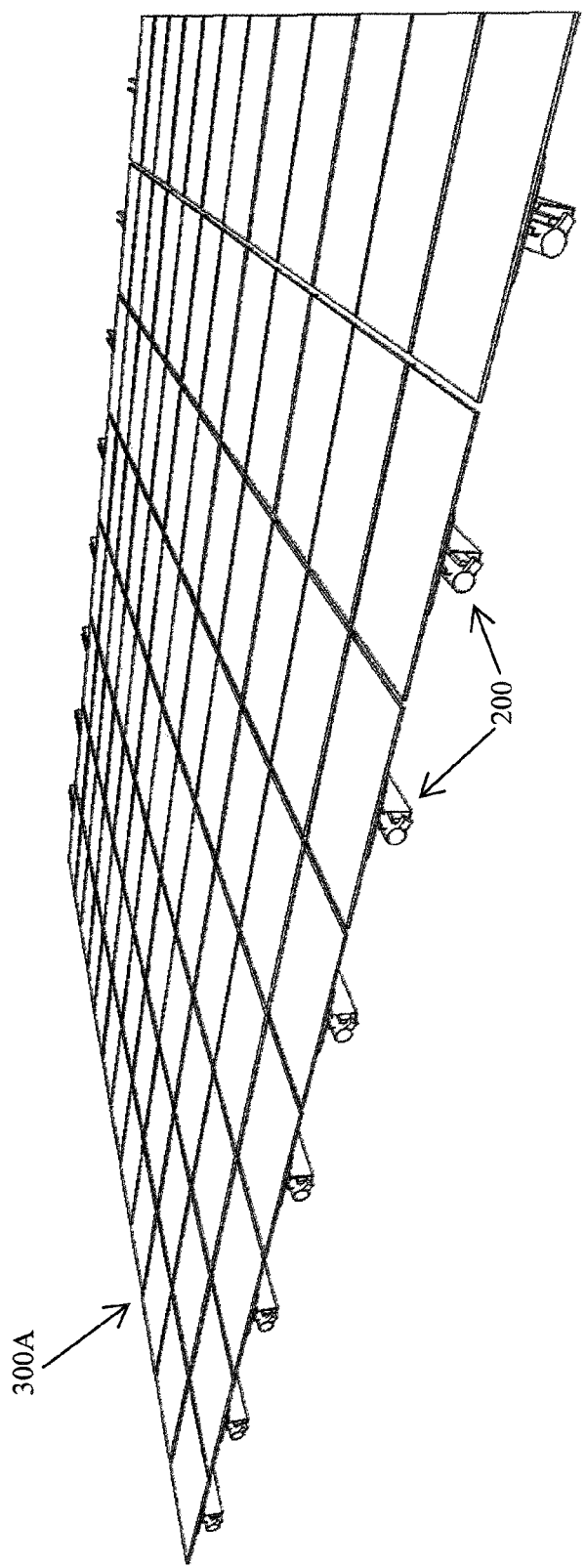
FIG. 9A is a perspective view, showing rows of single axis tracking assemblies mounted in a flush mount configuration.
Figure 9B:
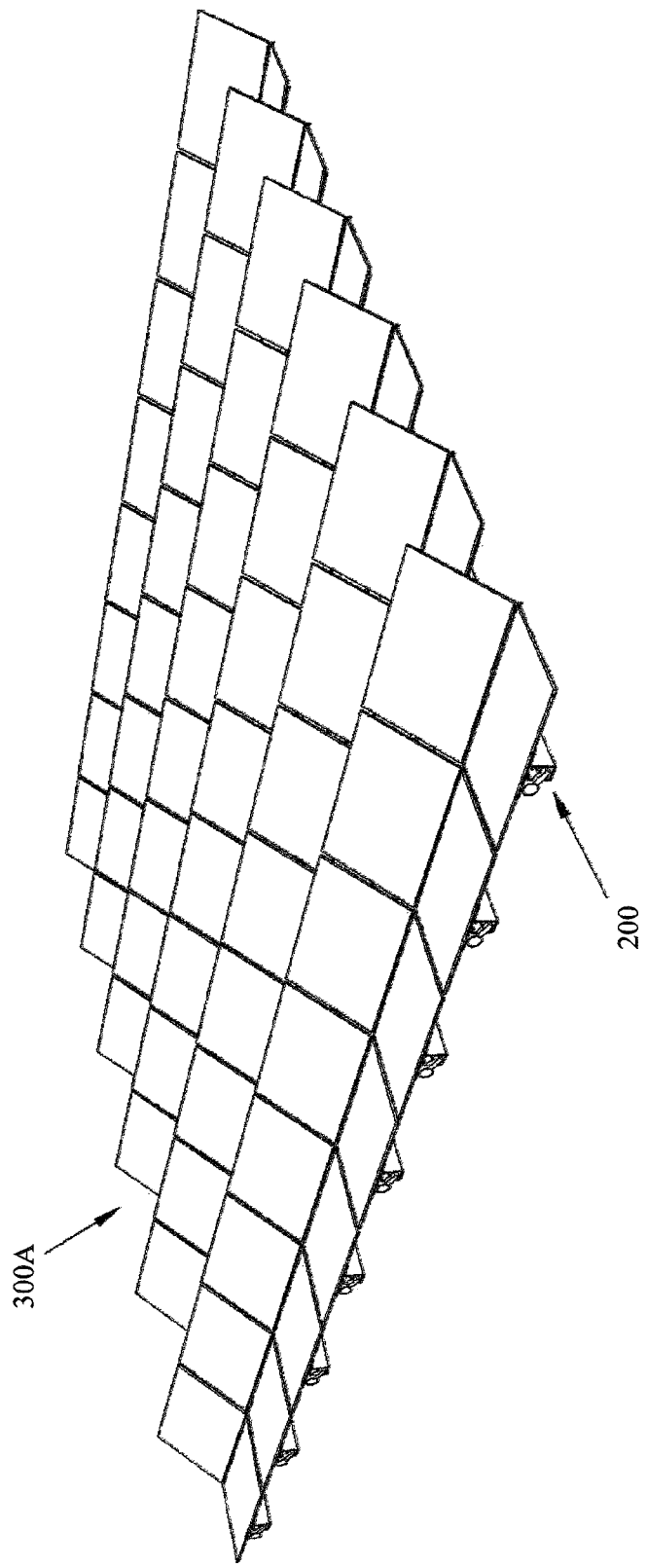
FIG. 9B is a front perspective view, showing rows of single axis tracking assemblies mounted in a flush mount configuration, with solar panels tilted towards the sun in a typical tracking position.
Figure 9C:
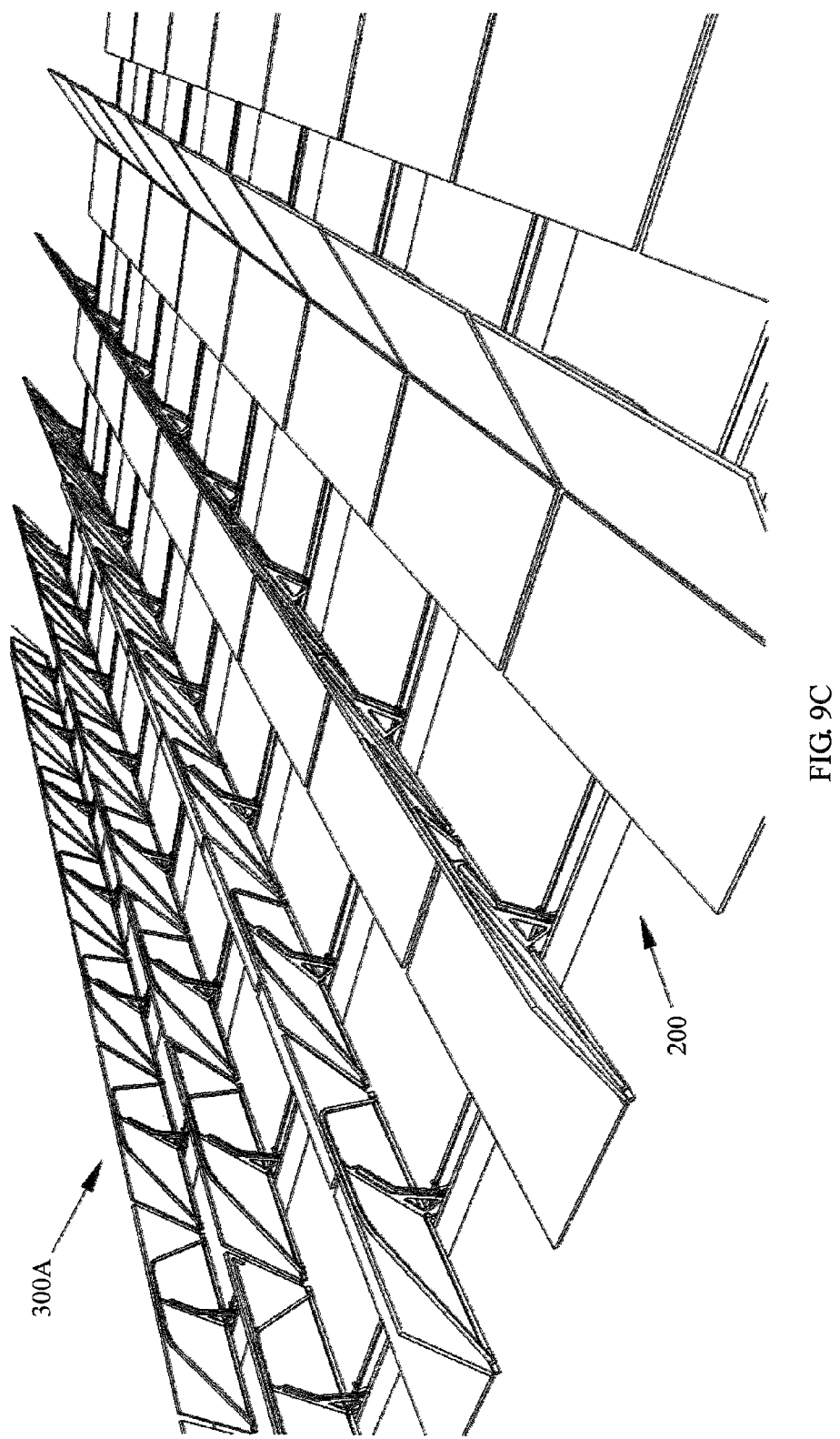
FIG. 9C is a rear perspective view, showing rows of single axis tracking assemblies mounted in a flush mount configuration, with solar panels tilted towards the sun in a typical tracking position.

FIG. 9A shows a perspective view of a flush mount configuration tracking system 300A. In this configuration, the system is comprised of rows of tracking assemblies 200 mounted adjacent to one another. An advantage of this configuration is that the solar panel arrangement uses all allotted space for solar power collection, thus producing a greater power output per allotted area. FIGS. 9B and 9C show a front and rear perspective, respectively, of this configuration with the solar panels tilted towards the sun in a typical tracking position.

Figure 9D:
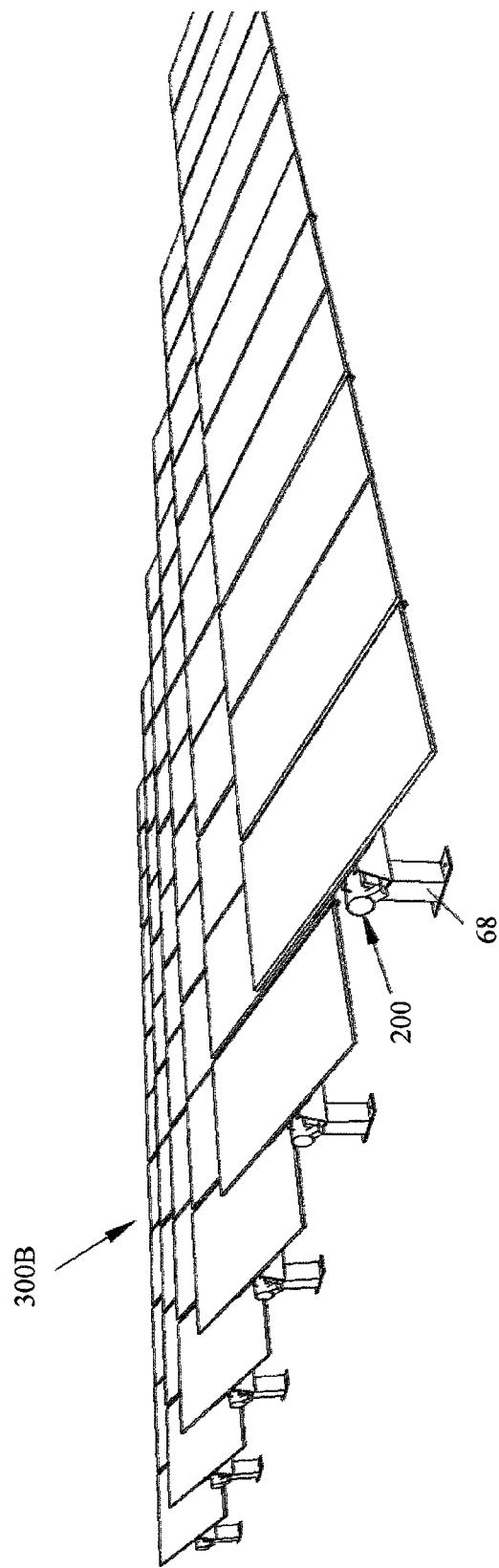
FIG. 9D is a perspective view, showing rows of single axis tracking assemblies mounted in a fixed tilt mount configuration, with space between adjacent rows.
Figure 9E:
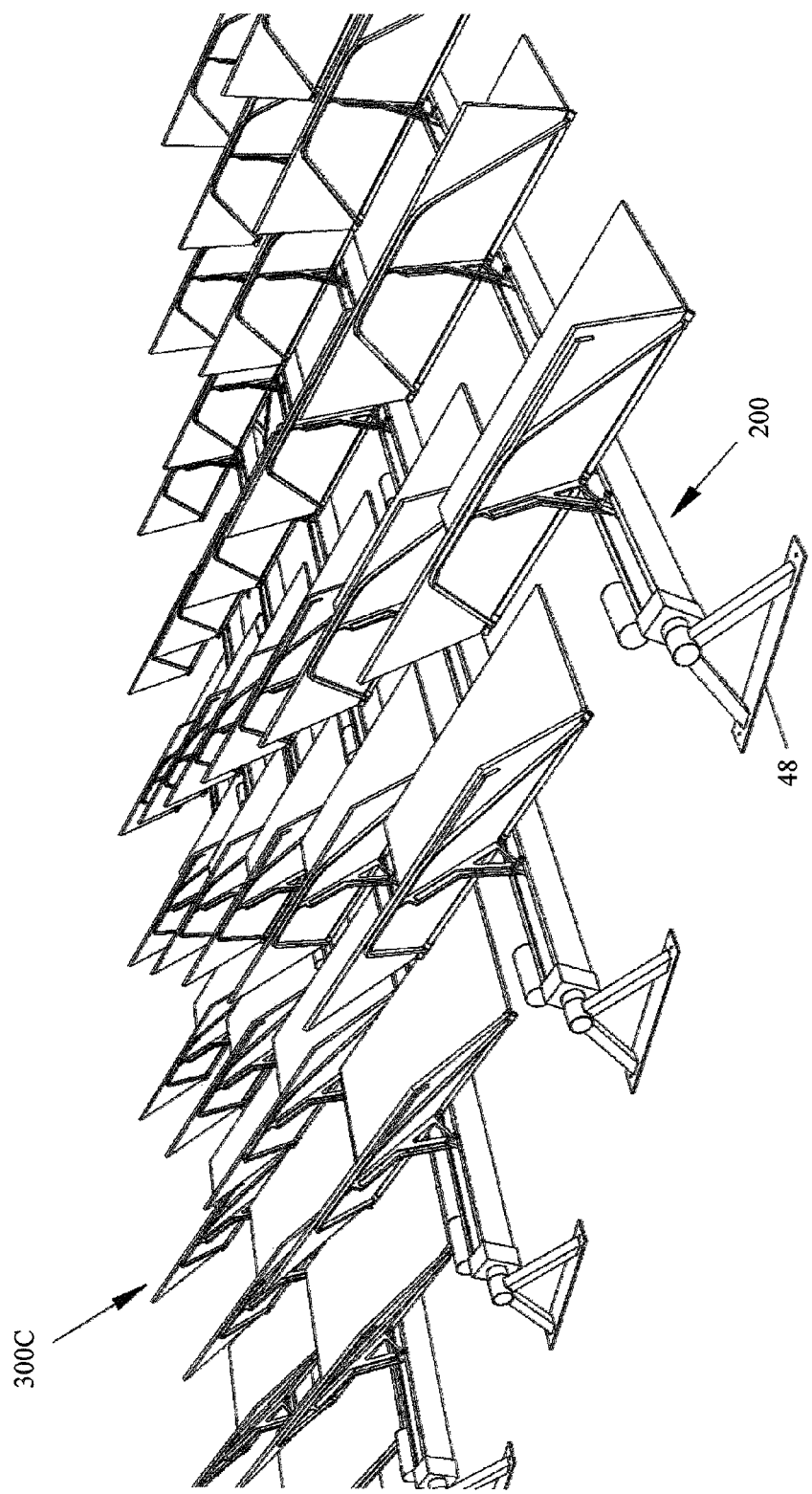
FIG. 9E is a perspective view, showing rows of dual axis tracking assemblies, mounted with space between adjacent rows.

FIG. 9D is a perspective view of a fixed tilt mount configuration tracking system 300B. In this configuration, the system is comprised of rows of tracking assemblies 200, each mounted at an optimum fixed tilt angle towards the sun, with space between adjacent rows. Each tracking assembly 200 is mounted at a fixed tilt angle, using a fixed tilt mounting pedestal 68.

FIG. 9E is a perspective view of a dual axis tracking system 300C. In this configuration, the system is comprised of rows of tracking assemblies 200, with space between adjacent rows. Each tracking assembly 200 is mounted to a seasonal axis 48 to provide the $2^{nd}$ tracking axis.

Figure 10:
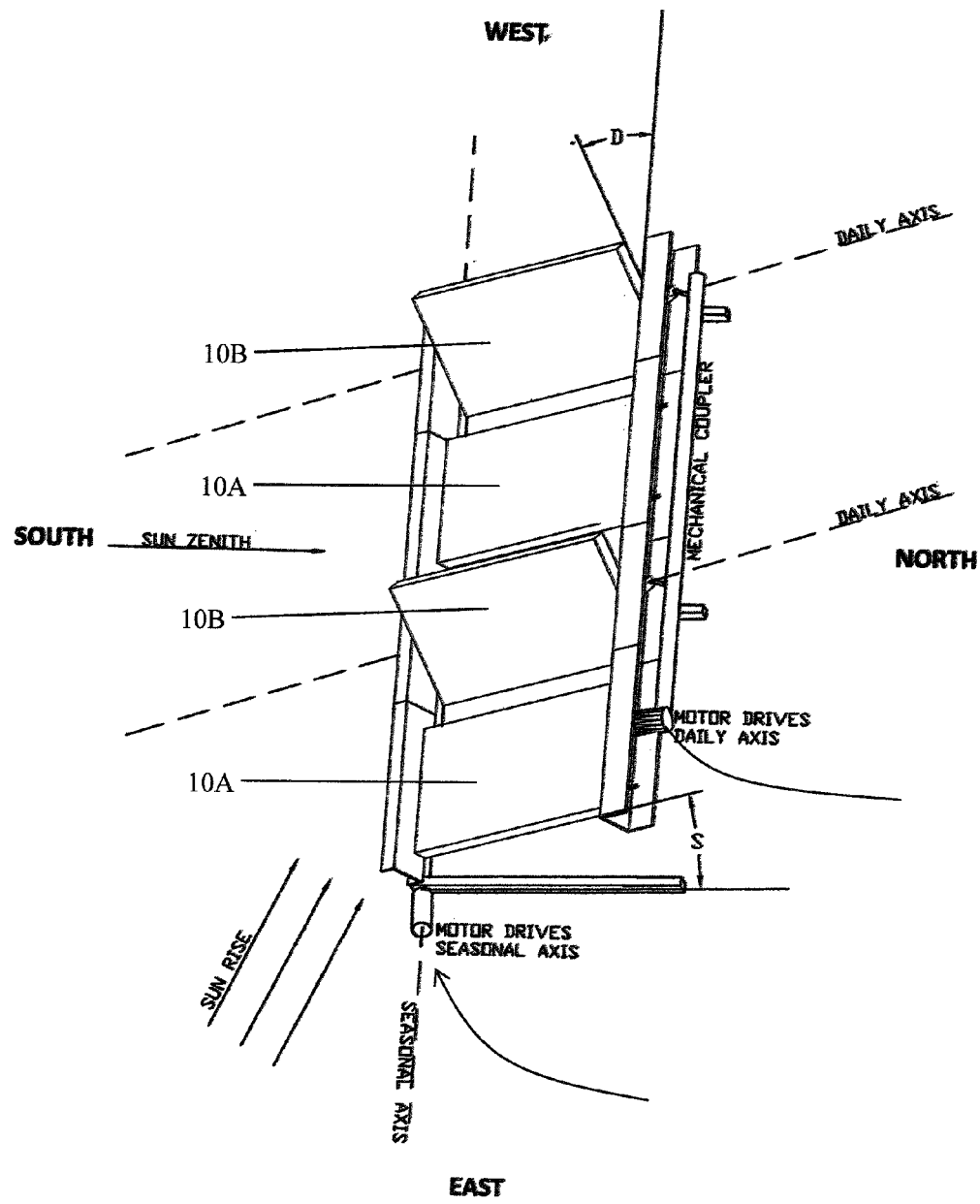
FIG. 10 is a top view of a different embodiment of a dual axis system with an assembly of alternating fixed and tracking solar panels.

FIG. 10 is a perspective view of a dual axis tracking system comprising fixed solar panels (10A) as well as tracking solar panels (10B). The $2^{nd}$ and $4^{th}$ panel will rotate together from an eastwardly facing direction in the morning all the way to a westerly facing direction at the end of the day, with the $1^{st}$ and $3^{rd}$ panels being fixed, and therefore horizontal. This system is equipped with dual axes, one for daily tracking only and one for seasonal tracking. Because of the staggered design, air flow surrounds each panel assuring all panels are sufficiently cooled.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention, which is to be limited only in accordance with the following claims.

What is claimed is:

1. A solar energy collection system, comprising:
   a frame comprising a plurality of tracking units for mounting the system on a suitable substrate, said frame lying along an axis, a plurality of said plurality of tracking units being disposed linearly along a portion of said frame to form a tracking assembly; and
   a plurality of solar panels disposed adjacent to one another on said frame, each of said solar panels comprising a top surface for collecting solar energy and directly converting the solar energy into electricity;
   a first set of said solar panels being movable about daily axes relative to a second set of said solar panels, the second set of said solar panels also being movable about daily axes relative to the first set of said solar panels, for tracking movement of the sun during the day, the daily axes lying in orientations which are generally orthogonal to an orientation of the frame axis, solar panels of said first set being arranged in alternating fashion with solar panels of said second set, each of said tracking units comprising a solar panel from each of said first and second sets;
   the plurality of said plurality of tracking units being arranged end-to-end on each tracking assembly, wherein the daily axes of each tracking unit are not coincident with one another on that tracking assembly;
   each of the first and second panels in each said tracking unit pivoting about its daily axis independently of the other of said first and second panels in that same tracking unit; and
   a drive system for pivoting each of said first and second panels in a tracking unit, said drive system being disposed on said frame;
   wherein a first solar panel in said first set is pivotally connected to a second solar panel in said second set, about one of said daily axes, on a hinge disposed therealong, to form one of said tracking units, the hinge being at a lowest position relative to each of the first and second solar panels, as measured from the frame, such that neither of the first and second solar panels is pivotable to an orientation where any part of the first or second solar panel is located at a position lower than the position of the hinge.

2. The solar energy collection system as recited in claim 1, wherein the panels in said second set of solar panels are disposed in a plane substantially horizontally, said plane being substantially parallel to planes in which said frame and the substrate on which the frame is mounted are disposed, the top surfaces of the second set of solar panels facing upwardly when lying in said substantially horizontal orientation.

3. The solar energy collection system as recited in claim 1, wherein the portion of the frame along which a plurality of said plurality of tracking units are disposed linearly comprises a structural channel.

4. The solar energy collection system as recited in claim 3, wherein said drive system comprises a drive shaft extending lengthwise through said channel, and a plurality of camming systems attached to said drive shaft for pivoting each one of the first and second solar panels in each tracking unit independently of the other one of that tracking unit's first and second solar panels.

5. The solar energy collection system as recited in claim 3, and further comprising a plurality of said structural channels, each of which accommodates a plurality of said plurality of tracking units.

6. A method for collecting solar energy, using a system comprising a frame and an array comprising a plurality of solar panels connected to the frame, the plurality of solar panels comprising a first set of first and second solar panels and a second set of first and second solar panels, wherein the first and second solar panels in each of the first and second sets are joined to one another by a hinge so that the first and second solar panels in each of the first and second sets are movable relative to one another, and further wherein the frame is mounted onto a suitable substrate, the method comprising steps of:
   calculating a panel tilt angle which maximizes solar energy collection of the system for the position of the sun in the sky at a particular time of day by factoring into consideration an orientation of a first panel relative to the sun to maximize an incidence of sunlight on a top surface of the panel;
   using a controller to move the first solar panel in each of the first and second sets in the array about a daily axis lying along the hinge, relative to the second solar panel joined thereto by the hinge, to the calculated panel tilt angle to thereby track the sun's position as a day progresses, during a first portion of the day; and
   using the controller to move the second solar panel in each of the first and second sets in the array about the daily axis, relative to the first solar panel joined thereto by the hinge, during a second portion of the day.

7. The method as recited in claim 6, wherein the first portion of a day comprises a period ending when the sun reaches its zenith, and the second portion of the day comprises a period beginning when the sun reaches its zenith.

8. The method as recited in claim 6, and further comprising a step of using the controller in said system to move at least portions of the array about a seasonal axis to account for seasonal variations in the position of the sun in the sky.

9. The method as recited in claim 6, and further comprising a step of using the top surfaces of each of the plurality of solar panels to directly convert sunlight into electricity.

10. The method as recited in claim 6, wherein the plurality of solar panels comprises additional sets of first and second solar panels wherein each additional set of first and second solar panels comprises a hinge lying along a daily axis which joins the first and second solar panels together, and further wherein the steps of using the controller to move the first solar panel and using the controller to move the second solar panel also move the first and second solar panels of the additional sets of first and second solar panels.

11. The method as recited in claim 10, wherein during the step of using the controller to move the first solar panels of each set, the first solar panels are moved simultaneously.

12. The method as recited in claim 10, wherein during the step of using the controller to move the second solar panels of each set, the second solar panels are moved simultaneously.

13. The method as recited in claim 6, and further comprising a step of reflecting incident light from the second set of solar panels onto the top surface of one of the first and second solar panels in the first set of solar panels, to compensate for shading effects.

14. The method as recited in claim 6, and further comprising:
   disengaging the first and second solar panels in the first set of solar panels from a drive system which the controller actuates to rotate the first and second solar panels about the hinge in the first set; and
   rotating at least one of the first and second solar panels manually about the hinge to an upright position, to perform maintenance on the first set of solar panels, the drive system, or the solar panels themselves.

15. The method as recited in claim 6, and further comprising:
   opening a valve to permit cleaning fluid to flow through a supply line;
   permitting the cleaning fluid to flow through a hollow shaft of the hinge of the first set of solar panels; and
   ejecting the cleaning fluid from the hollow shaft onto the first and second solar panels of the first set of solar panels.

* * * * *